United States Patent
Takata (10) Patent No.: US 8,222,818 B2
(45) Date of Patent: Jul. 17, 2012

(54) COLD CATHODE TUBE LAMP, LIGHTING DEVICE FOR DISPLAY DEVICE, DISPLAY DEVICE, AND TELEVISION RECEIVING DEVICE

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/676,049

(22) PCT Filed: Apr. 9, 2008

(86) PCT No.: PCT/JP2008/056978
§ 371 (c)(1), (2), (4) Date: Mar. 2, 2010

(87) PCT Pub. No.: WO2009/031335
PCT Pub. Date: Mar. 12, 2009

(65) Prior Publication Data
US 2010/0157575 A1 Jun. 24, 2010

(30) Foreign Application Priority Data
Sep. 4, 2007 (JP) .................. 2007-229069

(51) Int. Cl.
*H01J 11/00* (2012.01)
*H01J 17/18* (2012.01)
*H01J 17/04* (2012.01)
(52) U.S. Cl. ......... 313/631; 313/567; 313/583; 313/623
(58) Field of Classification Search ........................ None
See application file for complete search history.

(56) References Cited

U.S. PATENT DOCUMENTS

| 6,087,774 A * | 7/2000 | Nakayama et al. ........... 313/607 |
| 6,853,139 B2 * | 2/2005 | Yamashita et al. ........... 313/623 |
| 7,358,675 B2 * | 4/2008 | Yamashita et al. ........... 313/631 |
| 2002/0140351 A1 | 10/2002 | Yamashita et al. |
| 2005/0077830 A1 | 4/2005 | Yamashita et al. |
| 2010/0182517 A1 * | 7/2010 | Takata ........................ 348/790 |
| 2010/0231813 A1 * | 9/2010 | Takata ........................ 348/790 |

FOREIGN PATENT DOCUMENTS

| CN | 1653584 A | 8/2005 |
| JP | 03-171545 A | 7/1991 |
| JP | 2002-289139 A | 10/2002 |
| JP | 2007066851 A * | 3/2007 |

OTHER PUBLICATIONS

English machine translation of JP 2007-066851 (Aoyama et al).*
English certified translation of JP 03-171545 (Mochimaru).*
Official Communication issued in International Patent Application No. PCT/JP2008/056978, mailed on Jul. 1, 2008.
Official Communication issued in corresponding Chinese Patent Application No. 200880104154.8, mailed on Apr. 12, 2011.

* cited by examiner

*Primary Examiner* — Natalie Walford
(74) *Attorney, Agent, or Firm* — Keating & Bennett, LLP (57) ABSTRACT

This cold cathode tube lamp comprises a glass tube (11) into which at least a rare gas is filled and a discharge tube composed of a pair of an electrode (21) and an electrode (22) disposed facing each other at both ends inside the glass tube (11). In the respective electrode (21) and electrode (22), lead terminals (31a, 31b, 31c) and lead terminals (32a, 32b, 32c), one end of each of which is connected to the electrode and the other end of each of which is led out to the outside of the glass tube (11) are provided.

6 Claims, 8 Drawing Sheets

COLD CATHODE TUBE LAMP, LIGHTING DEVICE FOR DISPLAY DEVICE, DISPLAY DEVICE, AND TELEVISION RECEIVING DEVICE

TECHNICAL FIELD

The present invention relates to cold cathode tube lamps.

BACKGROUND ART

Conventionally, cold cathode tube lamps are used as a light source in various devices. For their low power consumption and long life spans as a light source, cold cathode tube lamps are used for a light source (backlight) in, for example, liquid crystal display devices and the like (see, for example, Patent Document 1 listed below).

Figure 14:
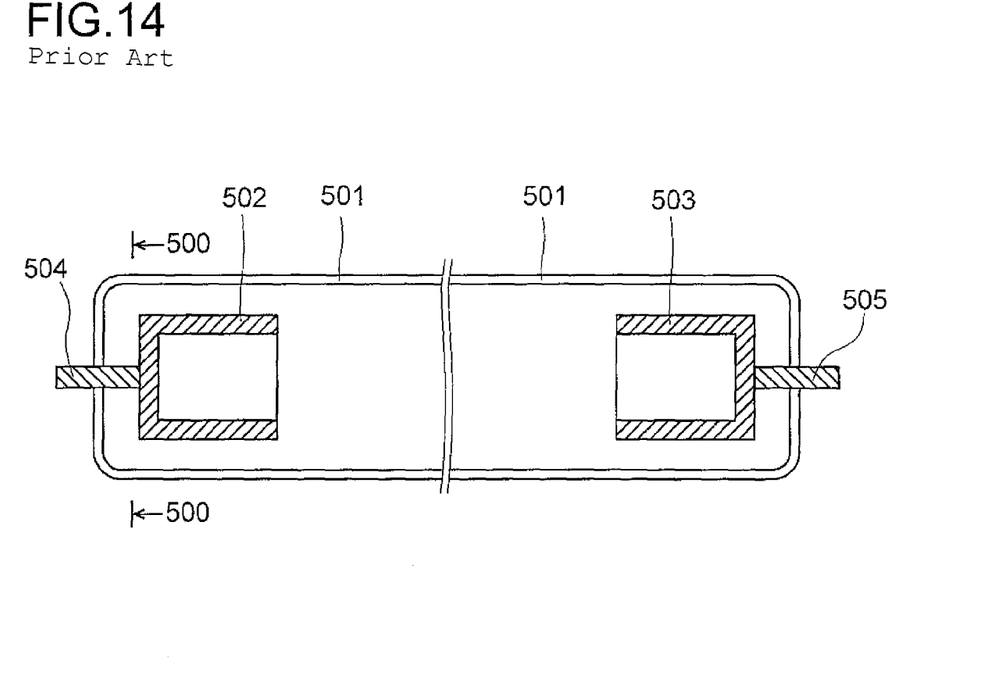
FIG. 14 A sectional view showing the structure of a conventional cold cathode tube lamp.
Figure 15:
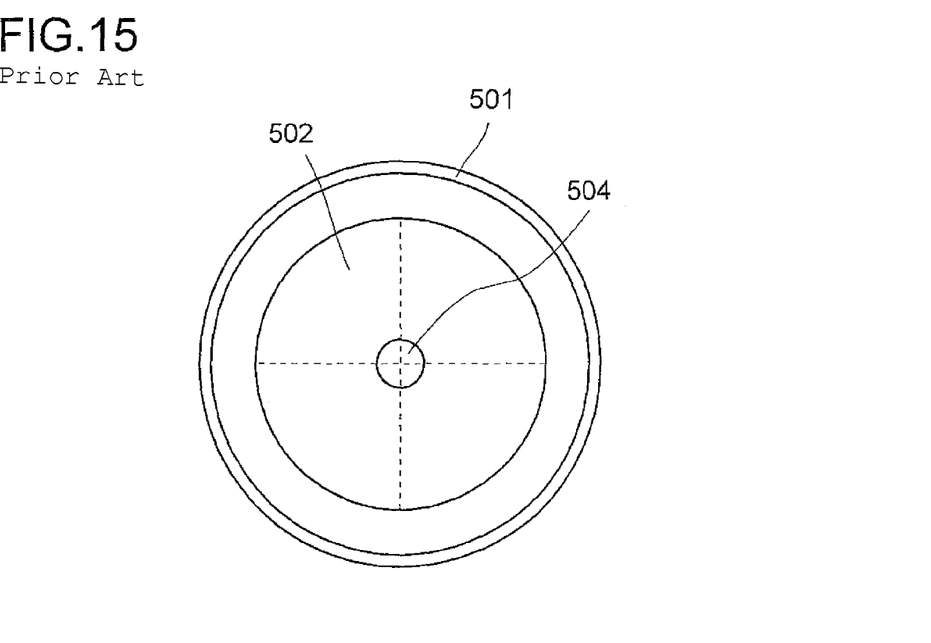
FIG. 15 A sectional view taken along line 500-500 in FIG. 14.

FIG. 14 is a sectional view showing structure of a conventional cold cathode tube lamp. FIG. 15 is a sectional view taken along line 500-500 in FIG. 14. Referring to FIGS. 14 and 15, the conventional cold cathode tube lamp will now be described.

As shown in FIG. 14, a conventional cold cathode tube lamp is provided with a glass tube 501, and with electrodes 502 and 503 forming a pair of cold cathodes arranged opposite each other inside the glass tube 501 at opposite ends thereof. Lead terminals 504 and 505 are connected to the electrodes 502 and 503 respectively. As shown in FIG. 14, the lead terminal 504 is, at one end, connected to the electrode 502 and is, at the other end, brought out of the glass tube 501. Likewise, the lead terminal 505 is, at one end, connected to the electrode 503 and is, at the other end, brought out of the glass tube 501. The glass tube 501 is airtightly sealed and hermetically closed by the lead terminals 504 and 505. Although unillustrated, a fluorescent substance is applied to the interior wall of the glass tube 501, and rare gas, such as argon or neon, along with mercury is, as discharge gas, sealed inside the glass tube 501.

In a cold cathode tube lamp as described above, when predetermined voltage is applied between the electrodes 502 and 503 via the lead terminals 504 and 505, a tiny number of electrons present inside the glass tube 501 are attracted to and collide with the electrode. As a result, from the electrode hit by electrons, secondary electrons are emitted, starting electric discharge. The emitted electrons collide with the mercury inside the glass tube 501, and the collision of electrons with mercury produces ultraviolet radiation. The ultraviolet radiation excites the fluorescent substance applied to the interior surface of the glass tube 501, causing visible rays to be emitted.

After use for a long time, the cold cathode tube lamp as described above suffers a phenomenon (sputtering) in which ions or the like colliding with the electrode 502 (503) expel atoms from metal material forming the electrode 502 (503). The atoms (sputtered matter) of the electrode metal expelled by the sputtering combine with the mercury inside the glass tube 501, and thus the mercury to be used for electric discharge is consumed, leading to a problem of diminished luminance in the cold cathode tube lamp. Diminished luminance in the cold cathode tube lamp makes it unusable as a backlight, counting as a factor in shorter life spans. Moreover, in the conventional cold cathode tube lamp as shown in FIG. 14, collision of ions or the like concentrates on the interior surface of a bottom part of the electrode 502 (503), and this produces a hole penetrating the bottom part of the electrode 502 (503), or in some cases even make the electrode 502 (503) drop off, thus resulting in breakage of the electrode 502 (503).

In the meantime, in recent years, further improvements have been sought in the backlights for lower power consumption, longer life spans, higher efficiency, etc. For example, as a way to solve the above-mentioned problem of shorter life spans resulting from the sputtering, a method is known which involves increasing the gas pressure inside the glass tube 501 of cold cathode tube lamp. Increasing the gas pressure inside the glass tube 501, by reducing the movement speed of electrons and otherwise, helps suppress the sputtering, and thus helps suppress shortening of the life span. While helpful in sustaining the life span of cold cathode tube lamp, however, increasing the gas pressure inside the glass tube 501 has disadvantage of lower light emission efficiency, and hence lower luminance. Moreover, increasing the gas pressure inside the glass tube 501 increases an energy loss resulting from the collision of electrons, and thus has disadvantage of increased heat generation as well. The increased heat generation raises tube wall temperature of the glass tube 501, and this causes a phenomenon of released ultraviolet radiation being re-absorbed by mercury, leading to the problem of lower light emission efficiency.

On the other hand, it is known that reducing the gas pressure inside the glass tube 501 and passing large electric current helps improve the light emission efficiency. Reducing the gas pressure inside the glass tube 501, however, by increasing the movement speed of electrons, makes the sputtering more likely to occur, leading to the problem of shorter life spans. One possible way to solve this problem is to increase tube diameter of the glass tube 501. Increasing the tube diameter of the glass tube 501 reduces electric current density over a discharge area on the electrode 502 (503) and makes the sputtering less likely to occur; doing so, thus helps suppress breakage of the electrode 502 (503) resulting from the sputtering, and thereby helps suppress shortening of the life span.
Patent Document 1: JP-A-2002-289139

DISCLOSURE OF THE INVENTION

Problems to be Solved by the Invention

Enlarging the electrode 502 (503), however, increases a load on the lead terminal 504 (505) supporting the electrode 502 (503), possibly causing deformation or breakage at a joint between the lead terminal 504 (505) and the electrode 502 (503). Enlarging the electrode 502 (503) also increases heat generation, which not only leads to the disadvantage of lower light emission efficiency, but also, as a result of the heat generated in the electrode 502 (503) concentrating on the lead terminal 504 (505), causes heat-induced damage to an end metal or circumferential connector connected to the lead terminal 504 (505).

The present invention is devised to overcome inconvenience as described above, and it is an object of the invention to provide a cold cathode tube lamp, a lighting device for display device, a display device, and a television receiving device that offer enhanced stability of electrodes.

Means for Solving the Problem

To achieve the above object, according to the invention, a cold cathode tube lamp comprises a discharge tube composed of a glass tube having at least a rare gas sealed therein and a pair of electrodes arranged opposite each other inside the glass tube at opposite ends thereof. Here, for each of the electrodes, there are arranged a plurality of lead terminals that are, at one end, connected to the corresponding electrode and are, at the other end, brought out of the glass tube.

With the above configuration, as a result of the cold cathode tube lamp being provided with the plurality of lead terminals that are, at one end, connected to the electrodes and are, at the other end, brought out of the glass tube, it is possible to support the electrodes securely, and also to reduce a load on the individual lead terminals. Thus, it is possible to suppress deformation or breakage in the lead terminals at the joint between the electrodes and the lead terminals. In this way, it is possible to suppress shortening of the life span of the cold cathode tube lamp resulting from breakage of the electrodes.

The provision of the plurality of lead terminals that are connected to the electrodes also makes it possible to dissipate the heat generated in the electrodes via the plurality of lead terminals. Thus, it is possible to suppress lowering of the light emission efficiency ascribable to a rise in the tube wall temperature of the glass tube resulting from lowered heat dissipation. Moreover, since the heat generated in the electrodes is dissipated via the plurality of lead terminals in a distributed fashion, it is possible to suppress heat-induced damage to an end metal or circumferential connector connected to the lead terminals.

In the cold cathode tube lamp constructed as described above, preferably, the electrodes have a cylindrical portion having a cylindrical shape open at one end and a bottom part closing the other end of the cylindrical portion, and, of the plurality of lead terminals, at least two are arranged, as seen on a plane, at positions opposite across a center of the bottom part of the electrode. With this configuration, the lead terminals can support the electrodes in good balance, and thus it is possible to suppress deformation or breakage occurring at the sealing between the lead terminals the glass tube. In this way, it is possible to suppress shortening of the life span of the cold cathode tube lamp resulting from breakage of the electrodes.

In the cold cathode tube lamp constructed as described above, preferably, the plurality of lead terminals are so arranged that, as seen on a plane, a center of gravity of a polygonal shape formed by the lead terminals substantially coincides with the center of a bottom part of the electrode. With this configuration, the lead terminals can support the electrodes in good balance, and thus it is possible to suppress deformation or breakage occurring at the sealing between the lead terminals the glass tube. In this way, it is possible to suppress shortening of the life span of the cold cathode tube lamp resulting from breakage of the electrodes.

In the cold cathode tube lamp constructed as described above, preferably, one of the plurality of lead terminals is arranged, as seen on a plane, at the center of a bottom part of the electrode. With this configuration, the lead terminals can support the electrodes securely, and it is possible to improve the balance of the lead terminals. Thus, it is possible to suppress deformation or breakage occurring at the sealing between the lead terminals the glass tube. In this way, it is possible to suppress shortening of the life span of the cold cathode tube lamp resulting from breakage of the electrodes.

In the cold cathode tube lamp constructed as described above, preferably, at least one of the plurality of lead terminals is electrically connected to the electrode. With this configuration, it is not necessary to electrically connect all of the plurality of lead terminals to the electrodes, and thus it is possible to suppress lowering of manufacturing efficiency.

In the cold cathode tube lamp constructed as described above, preferably, the glass tube has an outer diameter of 4 mm or more, and in addition the electrodes have an outer diameter of 2 mm or more.

To achieve the above object, according to the invention, a lighting device for display device comprises the cold cathode tube lamp described above.

With this configuration, as a result of the lighting device for display device being provided with the cold cathode tube lamp described above, it is possible to suppress shortening of the life span of the cold cathode tube lamp resulting from deformation or breakage in the lead terminals at the joint between the electrodes and the lead terminals, and also to suppress lowering of light emission efficiency ascribable to the heat generated in the electrodes. Thus, it is possible to suppress lowering of reliability of the lighting device for display device.

To achieve the above object, according to the invention, a display device comprises the lighting device for display device described above.

With this configuration, as a result of the display device being provided with the lighting device for display device described above, it is possible to suppress shortening of the life span of the cold cathode tube lamp resulting from deformation or breakage in the electrodes of the cold cathode tube lamp, and also to suppress lowering of light emission efficiency of the cold cathode tube lamp ascribable to heat generation in the cold cathode tube lamp. Thus, it is possible to enhance the reliability of the display device.

To achieve the above object, according to the invention, a television receiving device comprises the display device described above.

With this configuration, as a result of the television receiving device being provided with the display device described above, it is possible to suppress inconveniences such as lowering of the reliability of the display device ascribable to a shortened life span, or lowered light emission efficiency, of the cold cathode tube lamp used in the lighting device for display device provided in the display device. Thus, it is possible to enhance the reliability of the television receiving device.

Advantages of the Invention

As described above, according to the present invention, it is possible to obtain a cold cathode tube lamp with enhanced stability of electrodes.

LIST OF REFERENCE SYMBOLS 11 glass tube
21, 22 electrode
31a, 31b, 31c, 32a, 32b, 32c lead terminal
100, 110, 120, 130, 140 cold cathode tube lamp
150 lighting device for display device
160 liquid crystal display device

BEST MODE FOR CARRYING OUT THE INVENTION

First Embodiment

Figure 1:
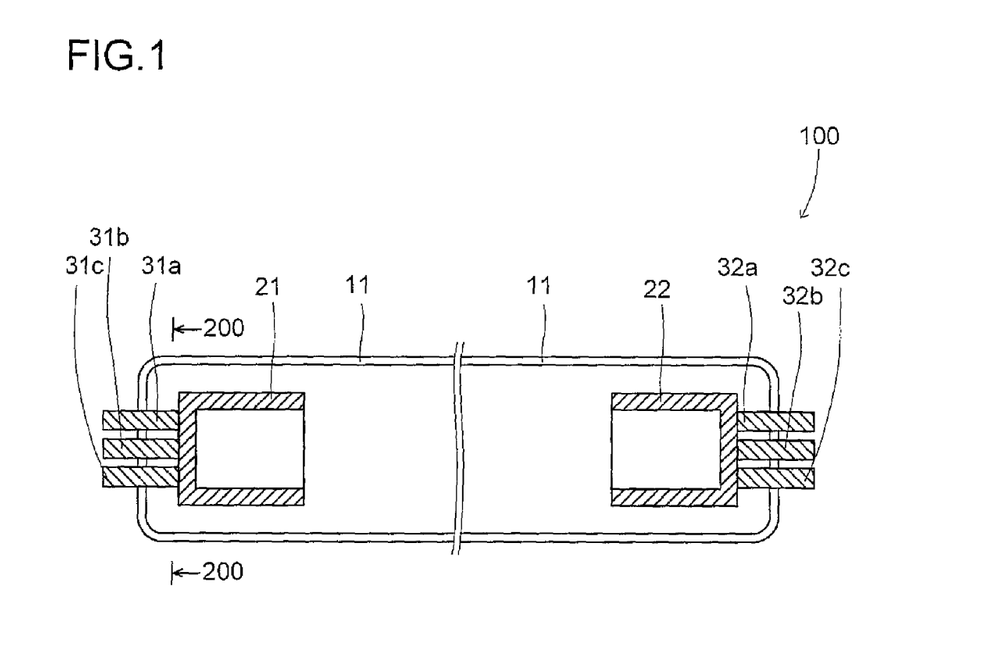
FIG. 1 A sectional view showing the structure of a cold cathode tube lamp according to a first embodiment.
Figure 2:
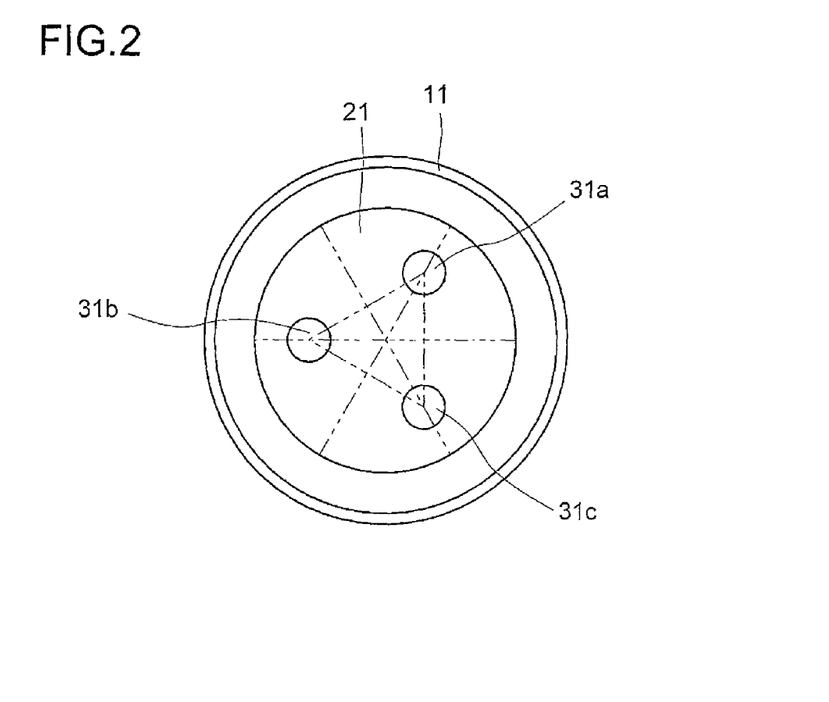
FIG. 2 A sectional view taken along line 200-200 in FIG. 1.

FIG. 1 is a schematic sectional view showing the structure of a cold cathode tube lamp 100 according to a first embodiment. FIG. 2 is a sectional view taken along line 200-200 in FIG. 1. The cold cathode tube lamp 100 according to the first embodiment of the invention will now be described with reference to FIGS. 1 and 2.

As shown in FIG. 1, the cold cathode tube lamp 100 according to the first embodiment of the invention is provided with a discharge tube composed of a glass tube 11 with an outer diameter of 4 mm to 20 mm, preferably 4 mm to 10 mm, and electrodes 21 and 22 forming a pair of cold cathodes disposed inside the glass tube 11 at opposite ends thereof. The electrodes 21 and 22 each have the shape of a cup composed of a cylindrical portion—having a cylindrical shape open at one end—and a bottom part—closing the other end of the cylindrical portion, the cylindrical portion having an outer diameter of 2 mm to 10 mm, preferably 2 mm to 3.5 mm. Although unillustrated, a fluorescent substance is applied to the interior wall of the glass tube 11, and rare gases (mixed gas of argon and neon) along with mercury are sealed inside the glass tube 11. In the first embodiment, the electrodes 21 and 22 are made of nickel (Ni), and can be formed by a pressing process, a ribbon process, or the like.

A plurality of (three) lead terminals 31a, 31b, and 31c are connected to the electrode 21, and a plurality of (three) lead terminals 32a, 32b, and 32c are connected to the electrode 22. As shown in FIG. 1, these lead terminals 31a to 31c and 32a to 32c are, at their other end, brought out of the glass tube 11, and the glass tube 11 is airtightly sealed and hermetically closed by the lead terminals 31a to 31c and 32a to 32c. In the first embodiment, the lead terminals 31a to 31c and 32a to 32c are made of nickel (Ni), and are welded to the electrodes 21 and 22. The lead terminals 31a to 31c and 32a to 32c each have an outer diameter of 0.6 mm to 0.8 mm.

In the first embodiment, as shown in FIG. 2, the three lead terminals 31a to 31c (32a to 32c) are so arranged that, as seen on a plane, a polygonal shape formed by the three lead terminals is equilateral-triangular, and that a center of gravity of the equilateral-triangular shape approximately coincides with a center of the bottom part of the electrode 21 (22). Arranging the three lead terminals 31a to 31c (32a to 32c) in this way permits the lead terminals 31a to 31c (32a to 32c) to be arranged in good balance physically; thus, even when the electrode 21 (22) is given a larger outer diameter, the electrode 21 (22) can be supported securely in good balance. This helps reduce the load on the individual lead terminals 31a to 31c (32a to 32c), and thus helps suppress deformation or breakage in the lead terminals 31a to 31c (32a to 32c) at the joint between the electrode 21 (22) and the lead terminals 31a to 31c (32a to 32c). In this way, it is possible to suppress shortening of the life span of the cold cathode tube lamp resulting from deformation or breakage at the joint between the electrodes and the lead terminals.

Moreover, as a result of the three lead terminals 31a to 31c, and 32a to 32c, being connected to the electrode 21, and 22, respectively, the heat generated in the electrode 21, and 22, is dissipated via the lead terminals 31a to 31c, and 32a to 32c, respectively. Thus, even when the electrode 21, and 22, is given a larger outer diameter and a larger amount of heat is generated, the generated heat can be dissipated efficiently via the three lead terminals 31a to 31c, and 32a to 32c, respectively. Thus, it is possible to suppress lowering of light emission efficiency ascribable to the heat generated in the electrodes 21 and 22. Moreover, since the heat generated in the electrode 21, and 22, is dissipated via the three lead terminals 31a to 31c, and 32a to 32c, in a distributed fashion, it is possible to suppress damage, caused by the heat concentrating on the lead terminals, to an end metal or circumferential connector connected to the lead terminals.

Moreover, use of a plurality of lead terminals 31a to 31c, and 32a to 32c, as described above permits use of lead terminals of a similar size (with an outer diameter of 0.6 mm to 0.8 mm) to conventional lead terminals. Thus, for example, it is possible to suppress the disadvantage of lower airtightness between the lead terminals and the glass tube which may result when the lead terminals are given a larger outer diameter. In this way, it is possible to suppress lowering of light emission efficiency, and degradation of light emission characteristics, resulting from leakage of the gas sealed inside the glass tube.

Second Embodiment

Figure 3:
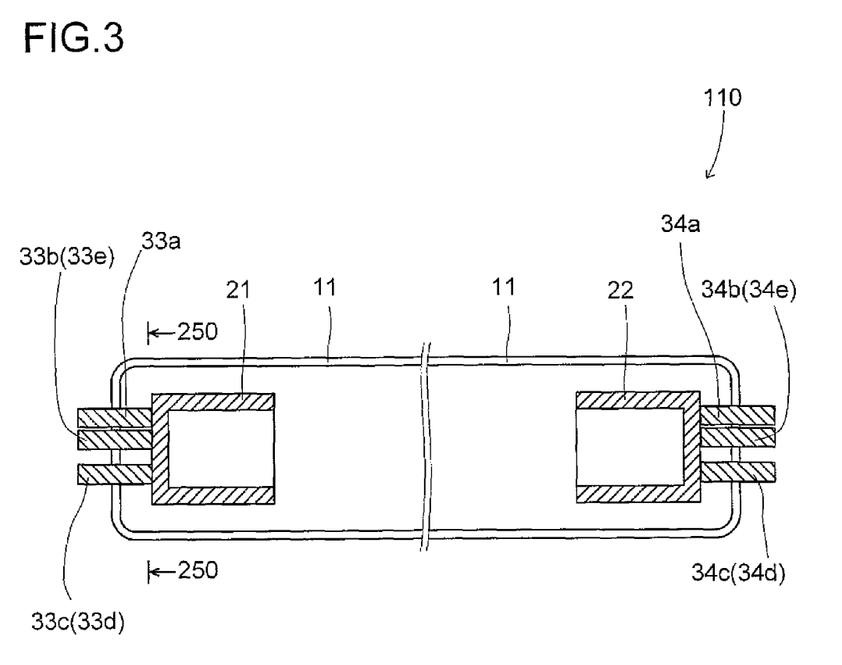
FIG. 3 A sectional view showing the structure of a cold cathode tube lamp according to a second embodiment.
Figure 4:
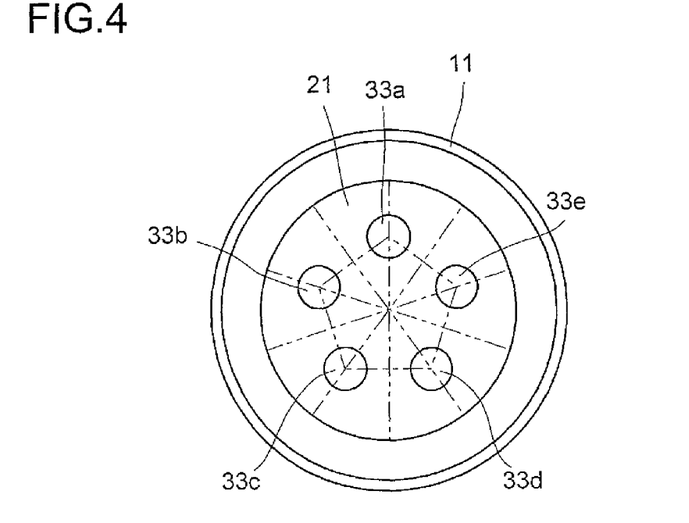
FIG. 4 A sectional view taken along line 250-250 in FIG. 3.

FIG. 3 is a schematic sectional view showing the structure of a cold cathode tube lamp 110 according to a second embodiment. FIG. 4 is a sectional view taken along line 250-250 in FIG. 3. Next, the cold cathode tube lamp 110 according to the second embodiment will be described with reference to FIGS. 3 and 4. In the second embodiment, such components as are similar to those in the first embodiment described previously are identified by common reference signs and their description will be omitted.

In the second embodiment, as shown in FIGS. 3 and 4, five lead terminals 33a, 33b, 33c, 33d, and 33e are connected to the electrode 21, and five lead terminals 34a, 34b, 34c, 34d, and 34e are connected to the electrode 22. In the second embodiment, as shown in FIG. 4, the five lead terminals 33a to 33e are so arranged that the polygonal shape formed by those lead terminals is equilateral-pentagonal, and that the center of gravity of the equilateral-pentagonal shape approximately coincides with the center of a cross section of the electrode 21.

In the second embodiment, as described above, the five lead terminals 33a to 33e (the lead terminals 34a to 34e) are arranged in good balance physically; thus, even when the electrode 21 (22) is given a larger outer diameter, the electrode 21 (22) can be supported securely in good balance by the five lead terminals 33a to 33e (the lead terminals 34a to 34e). This helps reduce the load on the individual lead terminals 33a to 33e (34a to 34e), and thus helps suppress deformation or breakage in the lead terminals 33a to 33c (34a to 34c) at the joint between the electrode 21 (22) and the lead terminals 33a to 33c (34a to 34c). In this way, it is possible to suppress shortening of the life span of the cold cathode tube lamp resulting from deformation or breakage at the joint between the electrodes and the lead terminals.

Moreover, as a result of the five lead terminals 33a to 33e, and 34a to 34c, being connected to the electrode 21, and 22, respectively, the heat generated in the electrode 21, and 22, is dissipated via the five lead terminals 33a to 33e, and 34a to 34e, respectively. Thus, even when the electrodes are enlarged and a larger amount of heat is generated, the heat can be dissipated efficiently. In this way, it is possible to suppress lowering of light emission efficiency ascribable to heat generation, and it is also possible to suppress damage to an end metal or circumferential connector connected to the lead terminals.

In other respects, the configuration of the second embodiment is similar to that of the first embodiment described previously.

Third Embodiment

Figure 5:
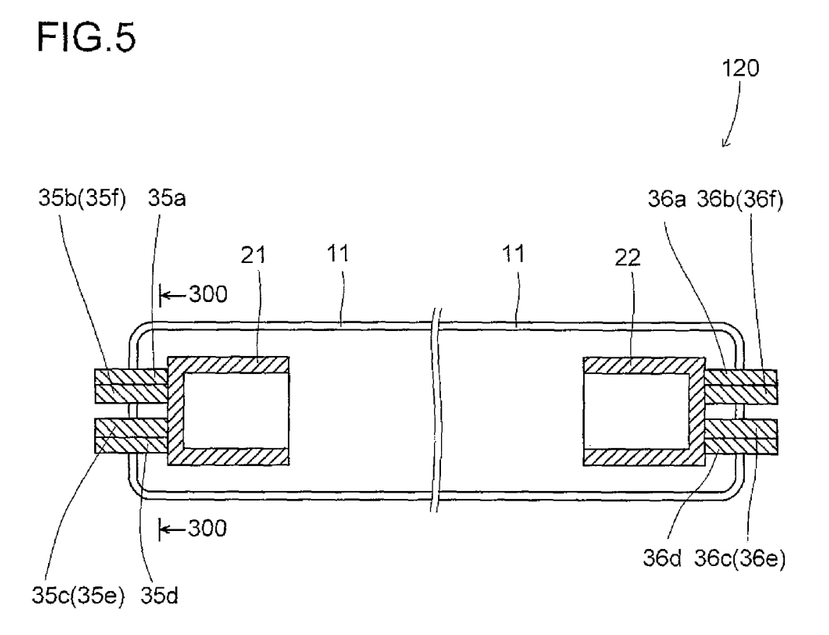
FIG. 5 A sectional view showing the structure of a cold cathode tube lamp according to a third embodiment.
Figure 6:
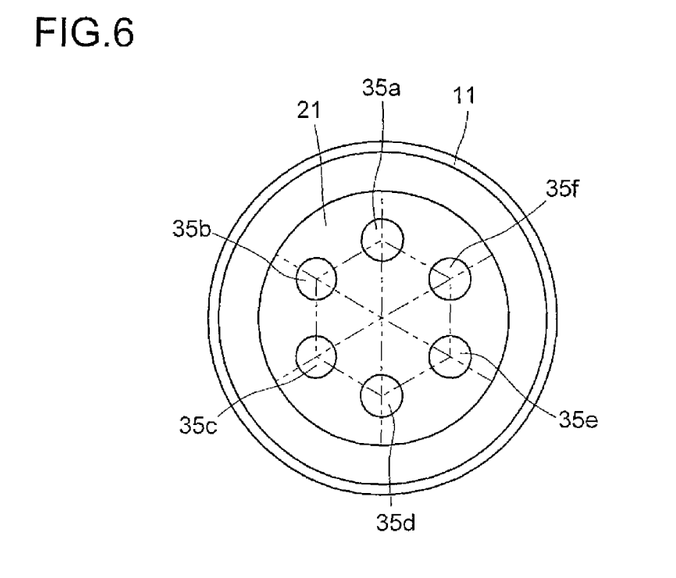
FIG. 6 A sectional view taken along line 300-300 in FIG. 5.

FIG. 5 is a schematic sectional view showing the structure of a cold cathode tube lamp 120 according to a third embodiment. FIG. 6 is a sectional view taken along line 300-300 in FIG. 5. Next, the cold cathode tube lamp 120 according to the third embodiment will be described with reference to FIGS. 5 and 6. In the third embodiment, such components as are similar to those in the first embodiment described previously are identified by common reference signs and their description will be omitted.

In the third embodiment, as shown in FIGS. 5 and 6, six lead terminals 35a, 35b, 35c, 35d, 35e, and 35f are connected to the electrode 21, and six lead terminals 36a, 36b, 36c, 36d, 36e, and 36f are connected to the electrode 22. In the third embodiment, as shown in FIG. 6, the six lead terminals 35a to 35f (36a to 36f) are so arranged that the polygonal shape formed by those lead terminals is equilateral-hexagonal, and that the center of gravity of the equilateral-hexagonal shape approximately coincides with the center of a cross section of the electrode 21 (22).

In the third embodiment, as described above, the six lead terminals 35a to 35f (36a to 36f) are arranged in good balance physically; thus, even when the electrode 21 (22) is given a larger outer diameter, the electrode 21 (22) can be supported securely in good balance by the six lead terminals 35a to 35f (36a to 36f). This helps suppress deformation or breakage in the lead terminals at the joint between the electrodes and the lead terminals, and thus it is possible to suppress shortening of the life span of the cold cathode tube lamp resulting from deformation or breakage at the joint between the electrodes and the lead terminals.

Moreover, as a result of the six lead terminals 35a to 35f, and 36a to 36f, being connected to the electrode 21, and 22, respectively, the heat generated in the electrode 21, and 22, is dissipated via the six lead terminals 35a to 35f, and 36a to 36f. Thus, even when the electrodes are enlarged and a larger amount of heat is generated, the heat can be dissipated efficiently. In this way, it is possible to suppress lowering of light emission efficiency ascribable to heat generation, and it is also possible to suppress damage to an end metal or circumferential connector connected to the lead terminals.

In other respects, the configuration of the third embodiment is similar to that of the first embodiment described previously.

Fourth Embodiment

Figure 7:
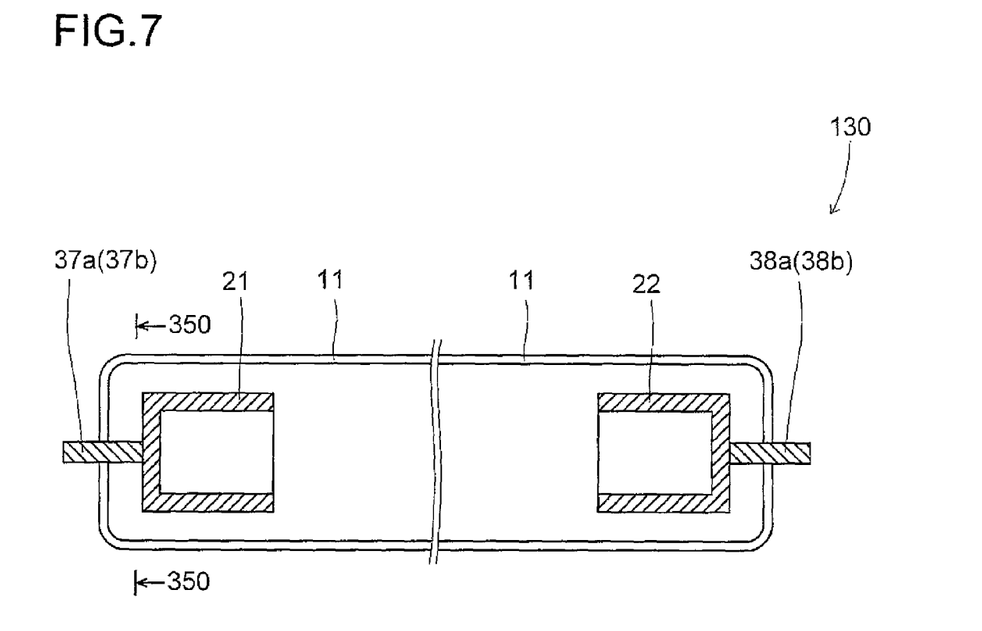
FIG. 7 A sectional view showing the structure of a cold cathode tube lamp according to a fourth embodiment.
Figure 8:
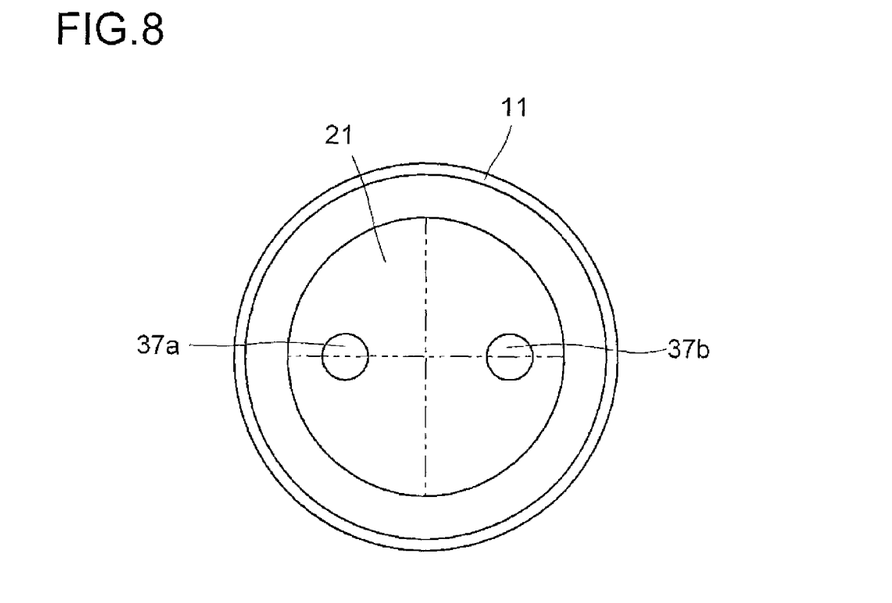
FIG. 8 A sectional view taken along line 350-350 in FIG. 7.

FIG. 7 is a schematic sectional view showing the structure of a cold cathode tube lamp 130 according to a fourth embodiment. FIG. 8 is a sectional view taken along line 350-350 in FIG. 7. Next, the cold cathode tube lamp 130 according to the fourth embodiment will be described with reference to FIGS. 7 and 8. In the fourth embodiment, such components as are similar to those in the first embodiment described previously are identified by common reference signs and their description will be omitted.

In the fourth embodiment, two lead terminals 37a and 37b are connected to the electrode 21, and two lead terminals 38a and 38b are connected to the electrode 22. In the fourth embodiment, as shown in FIG. 8, the two lead terminals 37a and 37b (38a and 38b) are arranged at opposite positions across the center of a cross section of the electrode 21 (22), and are so arranged that the straight line formed by the two lead terminals 37a and 37b (38a and 38b) passes through the center of a bottom part of the electrode 21 (22). Arranging the two lead terminals 37a and 37b (38a and 38b) in this way helps improve the physical balance of the lead terminals 37a and 37b (38a and 38b) with respect to the electrode 21 (22); thus, even when the electrode 21 (22) is given a larger outer diameter, the electrode 21 (22) can be supported securely in good balance. In this way, it is possible to suppress deformation or breakage in the lead terminals at the joint between the electrodes and the lead terminals, and thus it is possible to suppress shortening of the life span of the cold cathode tube lamp resulting from deformation or breakage at the joint between the electrodes and the lead terminals.

Moreover, as a result of the two lead terminals 37a and 37b, and 38a and 38b, being connected to the electrode 21, and 22, respectively, the heat generated in the electrode 21, and 22, is dissipated via the two lead terminals 37a and 37b, and 38a and 38b, respectively. Thus, even when the electrodes are given a larger outer diameter and a larger amount of heat is generated, the heat can be dissipated efficiently. In this way, it is possible to suppress lowering of light emission efficiency ascribable to heat generation, and it is also possible to suppress inconveniences such as damage to an end metal or circumferential connector connected to the lead terminals.

In other respects, the configuration of the fourth embodiment is similar to that of the first embodiment described previously.

Fifth Embodiment

Figure 9:
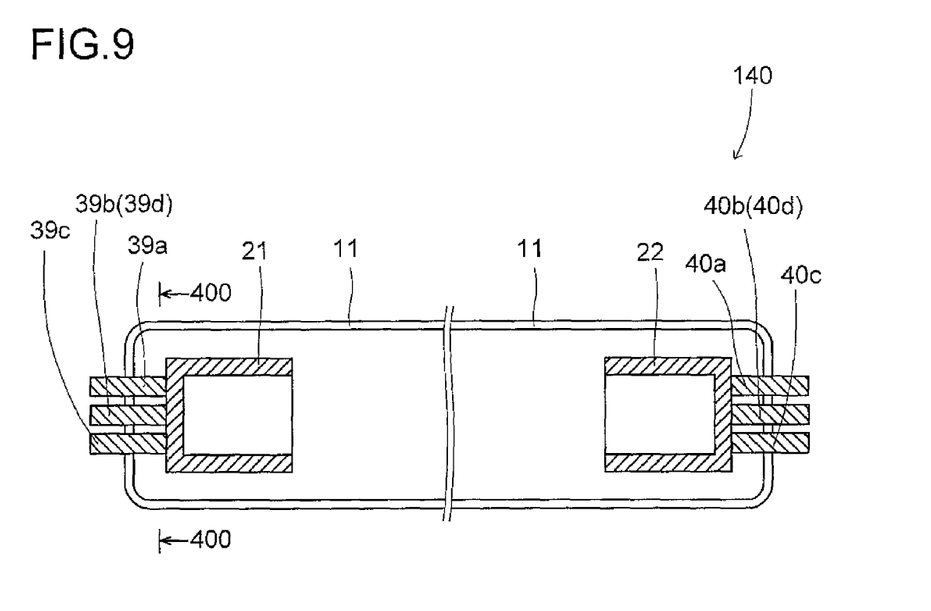
FIG. 9 A sectional view showing the structure of a cold cathode tube lamp according to a fifth embodiment.
Figure 10:
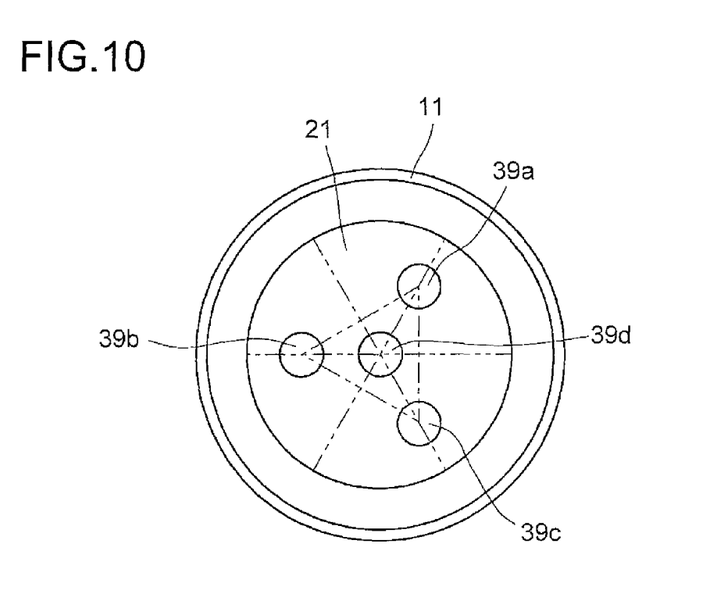
FIG. 10 A sectional view taken along line 400-400 in FIG. 9.

FIG. 9 is a schematic sectional view showing the structure of a cold cathode tube lamp 140 according to a fifth embodiment. FIG. 10 is a sectional view taken along line 400-400 in FIG. 9. Next, the cold cathode tube lamp 140 according to the fifth embodiment will be described with reference to FIGS. 9 and 10. In the fifth embodiment, such components as are similar to those in the first embodiment described previously are identified by common reference signs and their description will be omitted.

In the fifth embodiment, four lead terminals 39a, 39b, 39c, and 39d are connected to the electrode 21, and four lead terminals 40a, 40b, 40c, and 40d are connected to the electrode 22. In the fifth embodiment, as shown in FIG. 10, three of the four lead terminals 39a to 39d (40a to 40d) are so arranged that the polygonal shape formed by the three lead terminals 39a to 39c (40a to 40c) is equilateral-triangular, and that the center of gravity of the equilateral-triangular shape formed by the three lead terminals 39a to 39c (40a to 40c) approximately coincides with the center of a bottom part of the electrode 21 (22). In addition, as shown in FIG. 10, the lead terminal 39d (40d) is arranged at the center of gravity of the equilateral-triangular shape (at the center of a bottom part of the electrode 21 (22)). Arranging the four lead terminals 39a to 39c (40a to 40c) in this way permits the lead terminals to be arranged in good balance physically; thus, even when the electrode 21 (22) is given a larger outer diameter, the electrode 21 (22) can be supported securely in good balance. In this way, it is possible to suppress deformation or breakage in the lead terminals at the joint between the electrodes and the lead terminals, and thus it is possible to suppress shortening of the life span of the cold cathode tube lamp resulting from deformation or breakage at the joint between the electrodes and the lead terminals.

Moreover, as a result of the four lead terminals 39a to 39d, and 40a to 40d, being connected to the electrode 21, and 22, respectively, the heat generated in the electrode 21, and 22, is dissipated via the four lead terminals 39a to 39d, and 40a to 40d, respectively. Thus, even when the electrodes are enlarged and a larger amount of heat is generated, the heat can be dissipated efficiently. In this way, it is possible to suppress lowering of light emission efficiency ascribable to heat generation, and it is also possible to suppress inconveniences such as damage to an end metal or circumferential connector connected to the lead terminals.

In other respects, the configuration of the fifth embodiment is similar to that of the first embodiment described previously.

Sixth Embodiment

Figure 11:
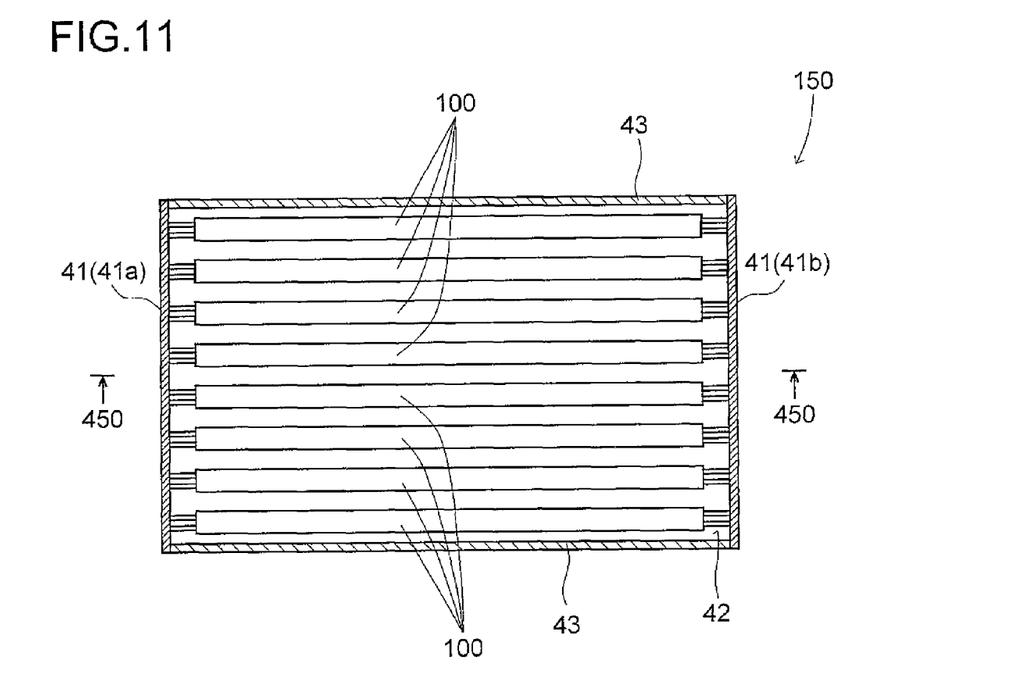
FIG. 11 A schematic diagram of a lighting device for display device according to a sixth embodiment.
Figure 12:
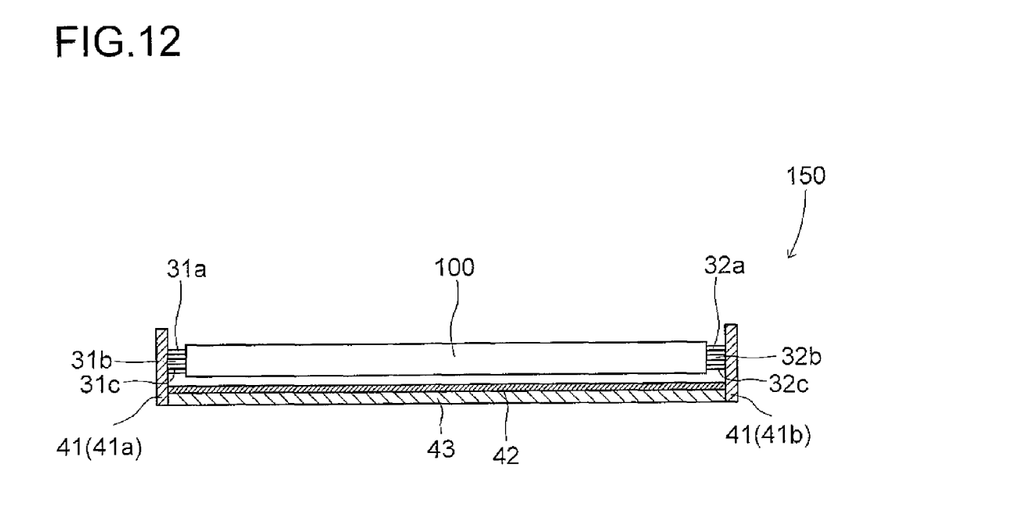
FIG. 12 A sectional view taken along line 450-450 in FIG. 11.

FIG. 11 is a schematic diagram of a lighting device 150 for liquid crystal display device, the lighting device 150 employing the cold cathode tube lamp 100 according to the first embodiment. FIG. 12 is a sectional schematic diagram taken along line 450-450 in FIG. 11. Next, the display-device-oriented lighting device 150 according to a sixth embodiment will be described with reference to FIGS. 11 and 12. In the sixth embodiment, such components as are similar to those in the first embodiment described previously are identified by common reference signs and their description will be omitted.

As shown in FIG. 11, the display-device-oriented lighting device 150 is provided with the following: a set of discharge tubes comprising a plurality of cold cathode tube lamps 100 arranged in parallel; cold cathode tube lamp holding members 41 (41a and 41b) holding the plurality of cold cathode tube lamps 100 forming the group of discharge tubes; a reflective composite member 42 disposed below the group of discharge tubes and reflecting the light emitted downward from the group of discharge tubes; and a back chassis 43 keeping the group of discharge tubes in fixed position. As shown in FIGS. 11 and 12, the cold cathode tube lamp holding members 41 (41a and 41b) are arranged at opposite positions so as to hold the lead terminals 31a to 31c and 32a to 32c of each of the plurality of cold cathode tube lamps 100. In this way, the plurality of cold cathode tube lamps 100 are collectively positioned and held by the cold cathode tube lamp holding members 41 (41a and 41b). The reflective composite member 42 is composed of, for example, a metal plate of aluminum or the like and a reflective sheet of resin affixed to the top surface of the metal plate. The back chassis 43 closes the group of discharge tubes in, and has the functions of keeping the strength of the display-device-oriented lighting device and of dissipating the heat generated in the group of discharge tubes (cold cathode tube lamps 100). Although unillustrated, a set of optical sheets, which will be described later, is arranged on the top face of the group of discharge tubes, that is, in front of the reflective composite member 42.

As shown in FIG. 11, the plurality of cold cathode tube lamps 100 are arranged in parallel, and as shown in FIG. 12, the lead terminals 31a to 31c of each of the plurality of cold cathode tube lamps 100 are held by the cold cathode tube lamp holding member 41a; likewise, the lead terminals 32a to 32c are held by the cold cathode tube lamp holding member 41b. On the back face of the back chassis 43, an unillustrated power supply is provided, and the cold cathode tube lamp holding members 41 (41a and 41b) are electrically connected to the power supply directly or via a connector or the like. Thus, alternating-electric current voltages of opposite phases are applied to the electrodes 21 and 22 (see FIG. 1) of the cold cathode tube lamps 100 via their respective lead terminals 31a to 31c and 32a to 32c.

Although the sixth embodiment described above deals with a case in which the cold cathode tube lamp 100 according to the first embodiment described previously is applied, this is in no way meant as a limitation; the cold cathode tube lamp of any of the second to fifth embodiments described previously may instead be used in a display-device-oriented lighting device as described above.

Seventh Embodiment

Figure 13:
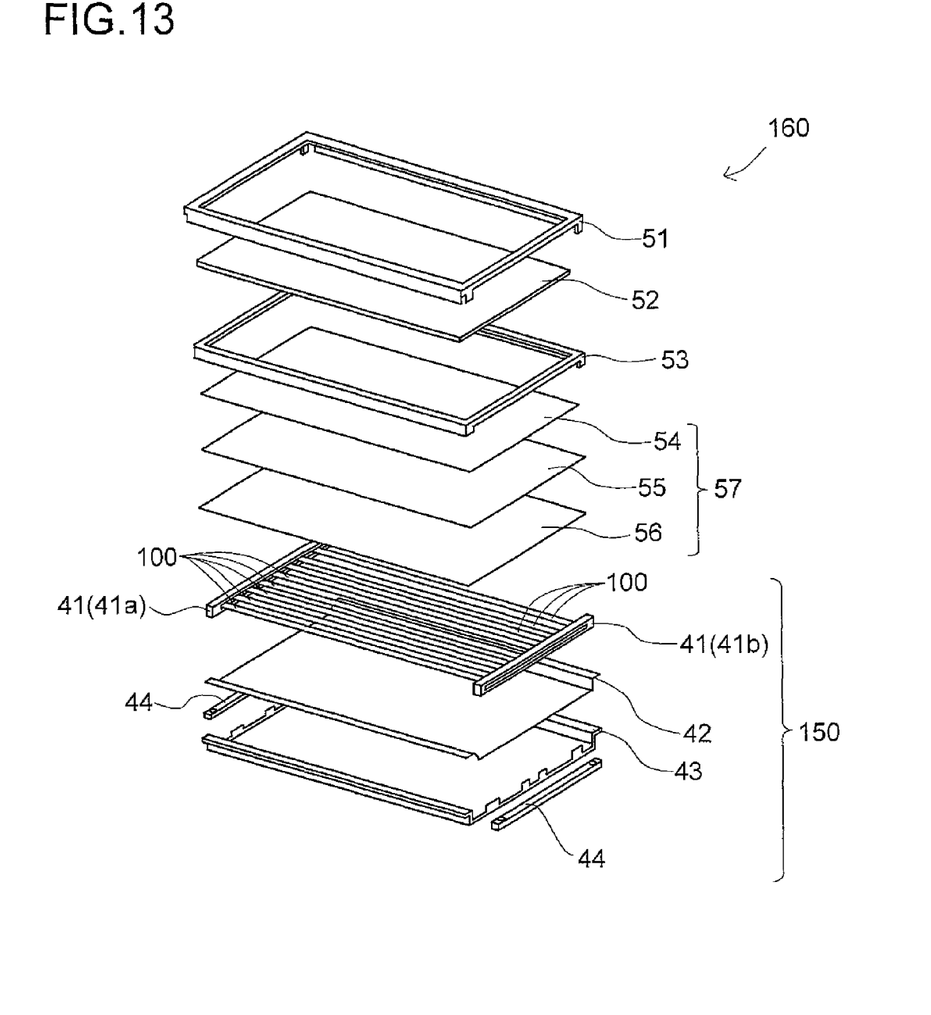
FIG. 13 An exploded perspective view of a liquid crystal display device according to a seventh embodiment.

FIG. 13 is an exploded perspective view of a liquid crystal display device 160 provided with the display-device-oriented lighting device 150 according to the sixth embodiment. Next, the liquid crystal display device 160 according to a seventh embodiment will be described with reference to FIG. 13. In the seventh embodiment, such components as are similar to those in the first and sixth embodiments described previously are identified by common reference signs and their description will be omitted.

As shown in FIG. 13, the liquid crystal display device 160 is provided with, above the display-device-oriented lighting device 150 according to the sixth embodiment, the following: a set of optical sheets 57; a liquid crystal panel 52 displaying an image; a front chassis 53 keeping the liquid crystal panel 52 in fixed position; and a bezel 51 protecting the liquid crystal panel 52. The set of optical sheets 57 comprises resin sheets diffusing, condensing, and otherwise acting upon the light they transmit, and has, for example, a diffuser sheet 54, a prism sheet 55, and a diffuser sheet 56 laid on one another in this order from the top. The number and combination of individual sheets in the set of optical sheets 57 may be changed as desired. The bezel 51 has the shape of a frame having an inverted-L-shaped section, and has openings formed at positions corresponding to insertion portions formed on the outer side surfaces of the cold cathode tube lamp holding members 41 (41a and 41b). This permits the bezel 51, the liquid crystal panel 52, the front chassis 53, the set of optical sheets 57, and the display-device-oriented lighting device 150 to be fitted together.

In the seventh embodiment, as described above, a display-device-oriented lighting device provided with a cold cathode tube lamp is arranged on the back face of a liquid crystal panel, and other components are arranged, so that the light emitted from the cold cathode tube lamp is directed to the liquid crystal panel. This permits an image and the like to be displayed on the liquid crystal panel.

Although the seventh embodiment described above deals with a liquid crystal display device, this is in no way meant as a limitation; cold cathode tube lamps according to the invention may be applied to any display devices other than liquid crystal display devices.

The liquid crystal display device according to the seventh embodiment described above can be employed, for example, in television receiving devices. A television receiving device according to the invention is provided with, for example, a terrestrial wave antenna, a television reception tuner, an output portion, a keyboard, a storage portion, a GPS reception antenna, a television reception portion, a GPS reception portion, and a control portion. The liquid crystal display device according to the seventh embodiment described above can be used as a display for reproduction from video and audio signals obtained through conversion by an MPEG2 decoder or video/audio decoder, and forms along with a speaker or the like the output portion mentioned above.

It is to be understood that all the embodiments disclosed herein are in every aspect meant to be illustrative and not restrictive. The scope of the invention is defined not by the description of the embodiments presented above but by what is recited in the appended claims, and encompasses any modifications and variations made in a spirit and scope equivalent to those of the appended claims.

For example, although the first to third and fifth embodiments described above take up, as an example, cold cathode tube lamps in which the polygonal shape formed by lead terminals is equilateral-polygonal, this is in no way meant as a limitation; the shape formed by lead terminals may be other than equilateral-polygonal. In such cases, the only requirement is that two of a plurality of lead terminals be arranged, as seen on a plane, at opposite positions across the center of a bottom part of an electrode, or that the lead terminals be so arranged that the center of gravity of the polygon formed by the lead terminals approximately coincides with the center of a bottom part of the electrode.

Although the first to seventh embodiments described above deal with examples in which a mixed gas of argon and neon is sealed inside a glass tube, this is in no way meant as a limitation; any rare gas other than argon or neon may instead be sealed in. Specifically, examples of such rare gases include xenon and krypton.

Although the first to seventh embodiments described above take up, as an example, electrodes made of nickel (Ni), this is in no way meant as a limitation; any metal material other than nickel (Ni) may instead be used. Specifically, examples of such metal materials include niobium (Nb), molybdenum (Mo), tungsten (W), etc.

Although the first to seventh embodiments described above take up, as an example, lead terminals made of nickel (Ni), this is in no way meant as a limitation; lead terminals made of any metal material other than nickel (Ni) may instead be used. Specifically, examples of metal materials other than nickel (Ni) include copper (Cu), tungsten (W), etc. Electrodes and lead terminals may be made of the same metal material, or may be made of different metal materials.

Although the sixth and seventh embodiments described above deal with examples in which the cold cathode tube lamp according to the first embodiment described previously is employed, this is in no way meant as a limitation; any cold cathode tube lamp within the scope of the appended claims, including the cold cathode tube lamps according to the second to fifth embodiments described previously, may instead be employed.

Although the seventh embodiment described above adopts, as an example, a construction in which a display-device-oriented lighting device provided with a cold cathode tube lamp is arranged on the back face of a liquid crystal panel, that is, a direct-lit type construction, this is in no way meant as a limitation; an edge-lit type construction may instead be adopted in which a display-device-oriented lighting device provided with a cold cathode tube lamp is arranged at an edge of a liquid crystal panel.

The invention claimed is:

1. A cold cathode tube lamp comprising a discharge tube composed of a glass tube having at least a rare gas sealed therein and a pair of electrodes arranged opposite each other inside the glass tube at opposite ends thereof,
   wherein, for each of the electrodes, there are arranged a plurality of lead terminals that are, at one end, connected to the corresponding electrode and are, at the other end, brought out of the glass tube; and
   the plurality of lead terminals are so arranged that, as seen on a plane, a center of gravity of a polygonal shape formed by the lead terminals substantially coincides with a center of a bottom part of the electrode.

2. The cold cathode tube lamp according to claim 1,
   wherein at least one of the plurality of lead terminals is electrically connected to the electrode.

3. The cold cathode tube lamp according to claim 1,
   wherein the glass tube has an outer diameter of 4 mm or more, and in addition the electrodes have an outer diameter of 2 mm or more.

4. A lighting device for display device, comprising the cold cathode tube lamp according to claim 1.

5. A display device comprising the lighting device for display device according to claim 4.

6. A television receiving device comprising the display device according to claim 5.

* * * * *